(No Model.)

T. JEWITT.
FLOWER VASE AND STAND.

No. 343,904. Patented June 15, 1886.

WITNESSES
Samuel C. Thomas
N. S. Wright

INVENTOR
Thomas Jewitt
By Wells W. Leggett, Attorney

UNITED STATES PATENT OFFICE.

THOMAS JEWITT, OF MILFORD, MICHIGAN.

FLOWER VASE AND STAND.

SPECIFICATION forming part of Letters Patent No. 343,904, dated June 15, 1886.

Application filed December 22, 1885. Serial No. 186,494. (No model.)

*To all whom it may concern:*

Be it known that I, THOMAS JEWITT, of Milford, county of Oakland, State of Michigan, have invented a new and useful Improvement in Flower Vases and Stands; and I declare the following to be a full, clear, and exact description of the same, such as will enable others skilled in the art to which it pertains to make and use it, reference being had to the accompanying drawings, which form a part of this specification.

My invention relates to certain new and useful improvements in flower vases and stands, as more particularly hereinafter described, and pointed out in the claims.

Figure 1:
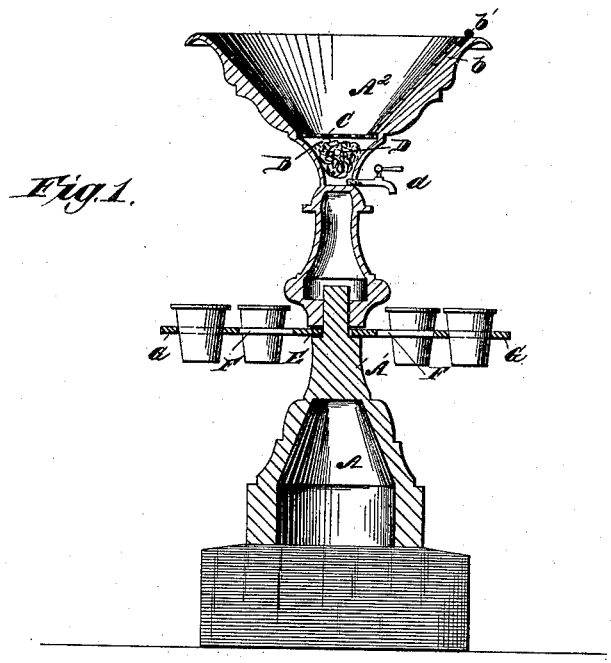
Figure 2:
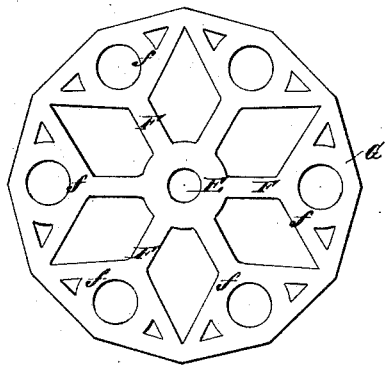
Figure 3:
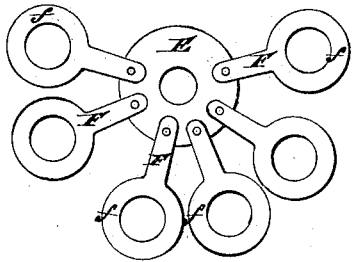

I carry out my invention as follows: In the drawings which form part of this specification, Figure 1 is a vertical section; Fig. 2, a horizontal section across the stem, and Fig. 3 a modification.

A represents the base of the vase; A', a stem supporting an earth-chamber, $A^2$, of suitable form, thereon.

B represents a water-reservoir, located at the base of the earth-chamber, provided with an inlet-tube, b, leading up along the side of the earth-chamber, as shown, by which water may be poured into said reservoir. This inlet-pipe may be provided with a stopper, b'.

C is a grating or screen, located above the reservoir, between it and the earth-chamber, to prevent the earth settling bodily into the reservoir, and to exclude therefrom gravel, &c. It will be observed that the removable grating, by fitting under the water-inlet pipe between it and the water-reservoir, is held in place by the pipe.

D is a sponge or analogous absorbing substance, located in said chamber, the grating being made removable, so that the sponge may be readily located in place or removed therefrom and cleansed or renewed whenever the earth-chamber may be emptied.

a is an outlet-faucet communicating with the base of the reservoir, by which the water may be withdrawn therefrom, should it at any time become stagnant or be liable to be reached by the frost, and also to facilitate the cleansing of the reservoir of any earthy matter which may pass thereto through the screen. By filling the reservoir through the inlet-pipe the tendency of the earth to trickle through the grating is principally obviated, the earth is moistened by capillary attraction, and the vessel being once filled will serve to keep the earth in the chamber moist for a considerable period. In large vases the reservoir would be of considerable capacity.

E represents a collar surrounding the stem of the vase, and provided with bracket-arms F, engaged therewith, having supports f at their outer ends to receive a flower-pot. These supports may be of any desired construction. The bracket-arms may have a pivotal connection with the collar at their inner ends, so that a series of flower-pots may be swung around to any desired side of the vase. The collar may be also rotatable upon the stem.

The bracket-arms F are shown in Figs. 1 and 2 as parts of an integral plate, and as the collar E, arms F, and annulus G are united in one structure, the rotary movement of the collar will carry around all the arms and the pots supported thereby.

A vase so constructed is found to be very convenient and useful. I prefer to make the base with its stem and earth-chamber supported thereon of metal, but do not limit myself to any definite material. The base in large vases may be provided with casters, if desired.

What I claim is—

1. A flower-stand composed of a base formed with a stem, A', a revolving flower-pot support connected with said stem, an earth-chamber, $A^2$, supported by said stem and removable therefrom and having a water-reservoir, B, in its base, and a removable grating, C, between the earth-chamber and water-reservoir.

2. The combination, with a vase composed of an upper and lower part separable from each other and one part provided with a stem, of a rotatable collar, E, encircling the stem between the upper and lower parts and rotatable thereon, and bracket-arms connected one with the other at their outer ends and with said collar at their inner ends and formed with openings for flower-pots, substantially as described.

In testimony whereof I sign this specification in the presence of two witnesses.

THOMAS JEWITT.

Witnesses:
F. E. TOWER,
JAMES G. PADLEY.